July 21, 1953     H. C. PAULSEN     2,646,199
MECHANISM FOR FILLING DISPENSING GUNS
Filed March 17, 1950     2 Sheets-Sheet 1
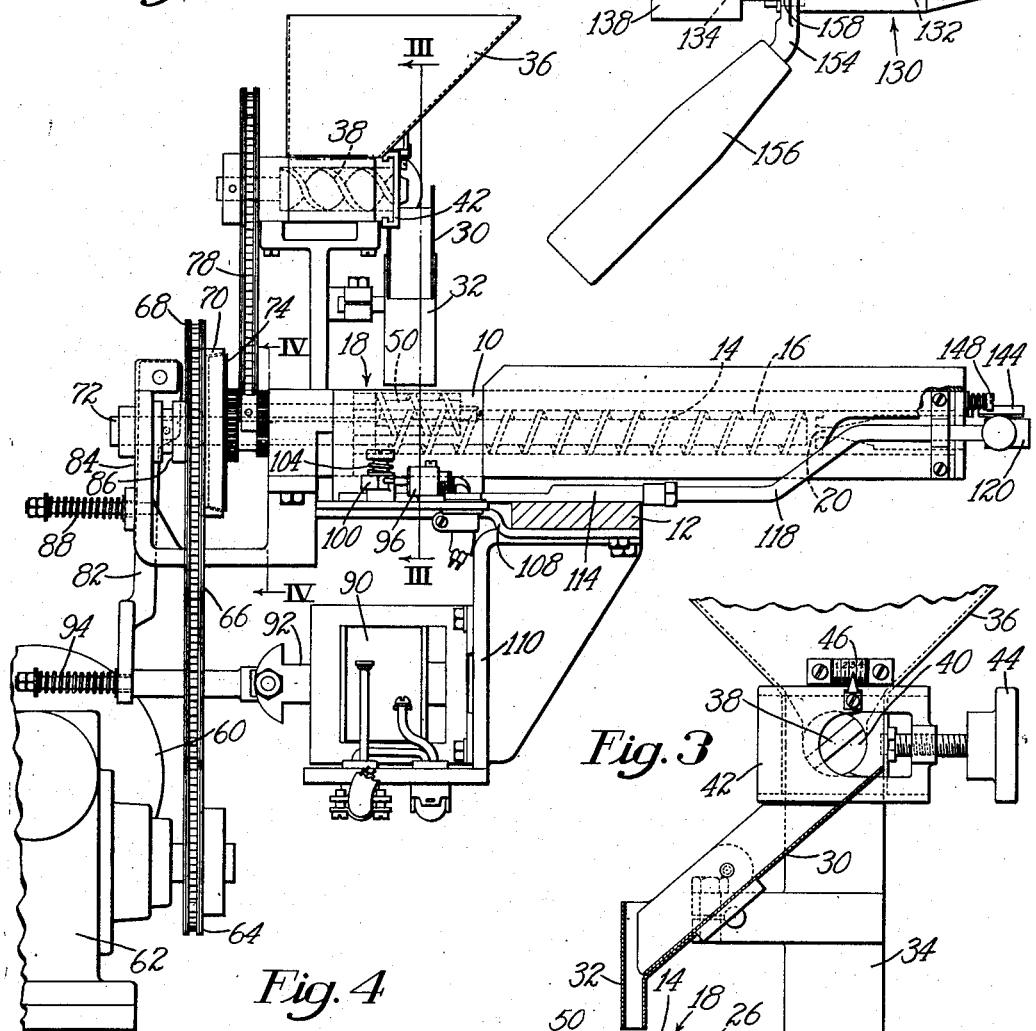
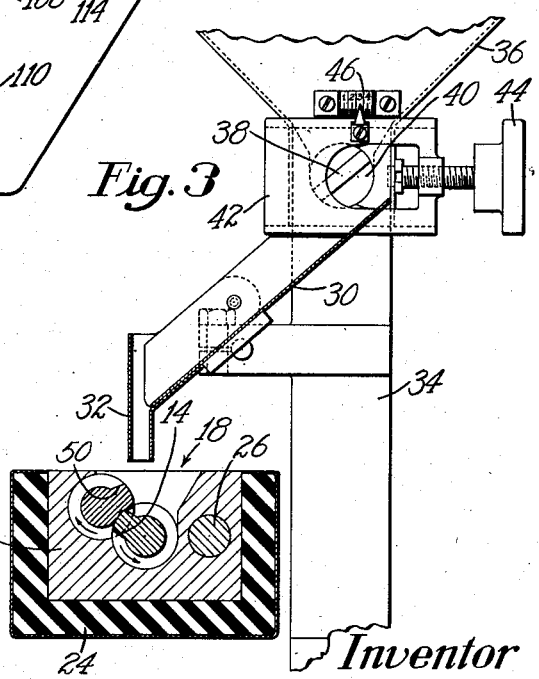
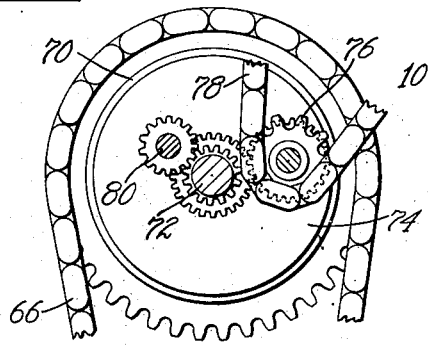
Inventor
Hans C. Paulsen July 21, 1953          H. C. PAULSEN          2,646,199
MECHANISM FOR FILLING DISPENSING GUNS
Filed March 17, 1950                          2 Sheets-Sheet 2
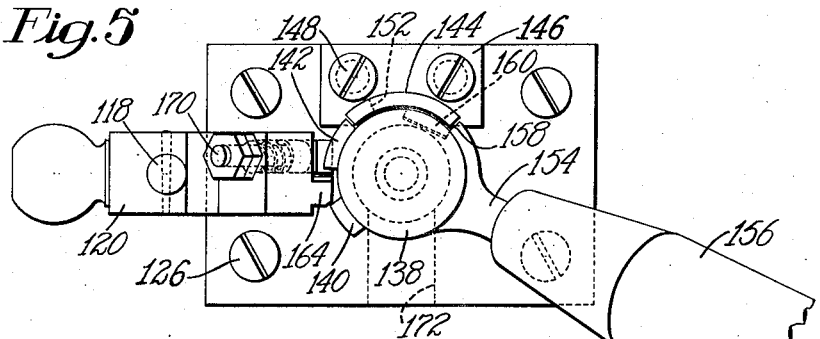
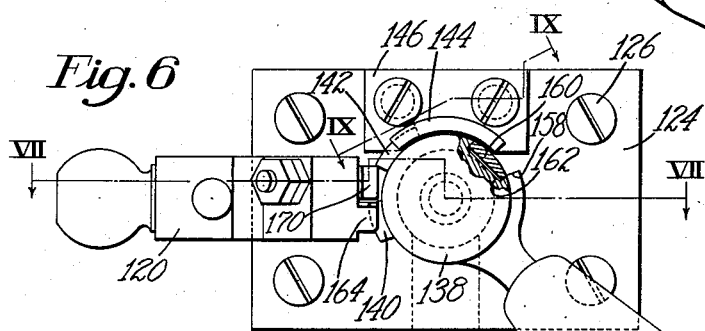
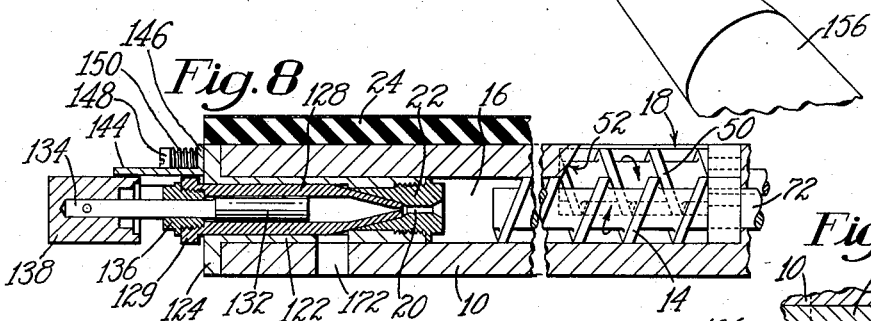
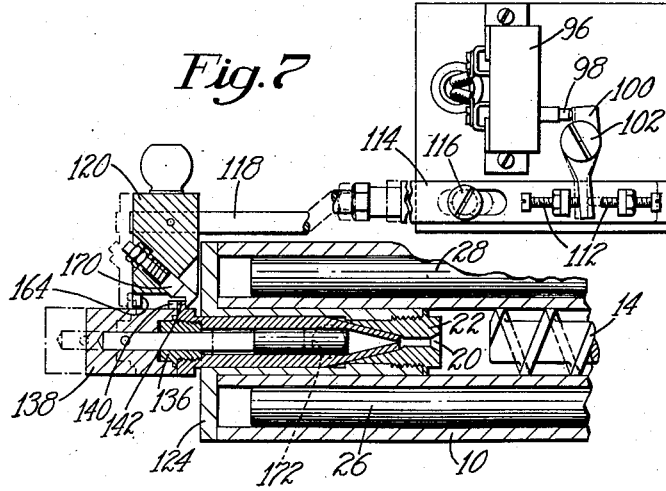
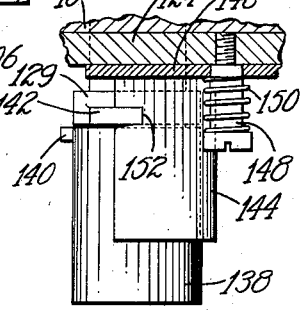
*Inventor*
Hans C. Paulsen
By his Attorney Patented July 21, 1953

2,646,199

UNITED STATES PATENT OFFICE 2,646,199

MECHANISM FOR FILLING DISPENSING GUNS

Hans C. Paulsen, Medford, Mass., assignor to United Shoe Machinery Corporation, Flemington, N. J., a corporation of New Jersey Application March 17, 1950, Serial No. 150,291

6 Claims. (Cl. 226—70)

This invention relates to extruding mechanisms for plastic materials and is herein illustrated as embodied in mechanism for use in filling plunger-operated dispersing guns which are separable from the extruding mechanism and capable of use for the application of plastic material to a piece of work.

Numerous plastic materials are applicable to the manufacture of shoes and can be employed, when softened, as adhesives for sticking together shoe parts. If such plastic materials are contained in a receptacle which is kept heated for a considerable period, it has been found that there is considerable difficulty in preventing such an overheating of the materials as may readily cause a change in the characteristics thereof and which frequently entails a great deal of difficulty in keeping the receptacle clean after the material has been softened and rehardened a number of times. One way of avoiding some of these difficulties is to utilize a plastic material which is in granular form and to deliver it, a little at a time, to an extruding machine where this material is carried along a heated passage to an outlet opening. With such arrangements the melting of the material takes place progressively along the length of the extruding mechanism, the latter being of sufficient extent so that the incoming material is still hard and granular while the extruded material is soft and fluid.

One object of the invention is the provision of an improved extruding mechanism arranged to facilitate the delivery of the granular material to the extruder passage.

Such extruding mechanisms comprise a feed screw operating in a passage between the inlet and the outlet openings. In machines of this type there is a tendency for the feed screw, at a point adjacent to the inlet opening, to push the material toward one side where it may accumulate and become sufficiently softened to bridge the opening. To avoid that difficulty the illustrated machine is provided with an auxiliary feed screw shown as meshing with the principal feed screw at the inlet opening and turning in the opposite direction, at a level slightly higher than the level of the main feed screw.

It is frequently desired, especially in the manufacture of shoes, to treat successive pieces of work each requiring only a small quantity of the material and in some cases it is found convenient to employ a portable dispensing gun by which the material may be applied to the work under the control of the operator. This very element of portability, however, precludes the gun from having a considerable capacity and it must be simply constructed so that the dispensing shall be at the will of the operator. One very simple type of such a gun includes a plunger the shaft of which is accessible to the operator and is provided with a knob operated by pressure of the operator's thumb to dispense the material.

With this in mind, another object of the invention resides in the provision of an automatic mechanism for shutting off the power driving the feed screw of the extruding mechanism when the gun has been filled to a predetermined degree.

This object is attained in accordance with other features of the invention by arranging the extruding mechanism so that the operator may attach the gun to that mechanism at its outlet end and may, by simple movements of the gun, connect the plunger thereof to a switch-operating member for the purpose previously described.

These and other features of the invention will best be understood from a consideration of the following specification taken in connection with the accompanying drawings in which Fig. 1 is a side elevation of the extruding mechanism including the electrically controlled drive therefor;

Fig. 2 is a side elevation of a dispensing gun having a manually operated plunger;

Fig. 3 is a vertical section on the line III—III of Fig. 1 showing the feed hopper and a chute for delivering the granular material to the inlet opening of the extruding mechanism;

Fig. 4 is a section on the line IV—IV of Fig. 1 looking at a portion of the drive mechanism;

Fig. 5 is an end elevation, on a larger scale, of the extruding mechanism, the associated switch operated member and a dispensing gun in the position which it occupies when being moved into place to receive a charge of material;

Fig. 6 is a similar view but with the gun turned to the position occupied during the filling of the gun;

Fig. 7 is a substantially horizontal section on the line VII—VII of Fig. 6 and showing the drive-controlling switch;

Fig. 8 is a vertical axial section through the end of the extruding mechanism with the gun in receiving position; and Fig. 9 is a section through the end of the extruding mechanism looking down upon the operating knob of the gun.

The extruding mechanism comprises an elongated block 10 mounted upon a supporting frame 12 and containing a feed screw 14 rotated in an elongated passage 16 in the block to carry granular material received at an inlet opening 18 and delivered to an outlet opening 20 (Fig. 8) shown as formed in a screw fitting 22 which closes the end of the passage 16. The block is preferably surrounded with heat insulating material 24 and is provided with electrical heating units 26 and 28 arranged along side the feed screw 14 so that granular material deposited in the inlet opening is heated progressively as it moves along the passage 16. By the time it reaches the outlet opening 20 it has been melted so that it may be readily extruded through that opening.

It will be noted that the inlet opening 18 (Fig. 3) is of a hopper shape. Associated with the opening is a chute 30 having a shielded end 32 positioned directly above the hopper-like opening 18. This chute, to keep it as cool as possible, is mounted upon a bracket post 34 extending upward from the frame 12 and used also to support a hopper 36 in which a supply of the granular material may be placed. At the bottom of this hopper there is a driven feed screw 38 the end of which lies adjacent to an opening 40. The size of this opening may be controlled by means of a slide cover 42 connected to a thumbscrew 44 for moving the slide horizontally. Duplication of the position of this slide is facilitated by a pointer thereon cooperating with a scale 46.

It will be seen from an inspection of Fig. 3 that there is a tendency for the principal feed screw 14, rotated in the direction of the arrow, to push the material toward one side of the inlet opening 18 and if this material accumulates and stops there long enough it will become softened and tend to bridge the opening. This difficulty is overcome, however, by the employment of an auxiliary feed screw 50 which extends along the main feed screw for a distance approximating the length of the feed opening and the block at the forward side of the feed opening is undercut as indicated at 52 in Fig. 8. The main and the auxiliary feed screws are rotated in opposite directions and their ribs intermesh so that granular material deposited from the chute 30 is continually pushed into the elongated passage 16 and carried forward therein by the principal feed screw 14.

For driving the various feed screws an electric motor 60 may be connected through reduction gearing 62, a sprocket 64 and a chain 66 to another sprocket 68 joined to the outer half 70 of a friction clutch. This outer half of the clutch is loose upon the shaft 72 of the feed screw 14 and when moved to the right in Fig. 1 grips the inner clutch cone 74 which is attached to that shaft. Another and smaller sprocket 76 (Fig. 4) coacts with a chain 78 driving the screw 38 in the hopper 36. This sprocket 76 is connected through a chain of gears to the drive shaft 72 and included in these gears is a pair connecting the shaft 72 to the shaft 80 of the auxiliary screw 50.

The operation of the clutch is effected by a swinging lever 82 pivoted upon a supporting bracket 84 and arranged to operate through a grooved collar 86 to move the freely rotating half 70 of the clutch into engagement with the other half 74. The lower end of this lever 82, which is swung to the left by a spring 88, is adapted to be operated by a solenoid 90. This has a core 92 connected to the lever 82 through a spring 94 to soften the action. The energization of this solenoid is effected by power transmitted through a microswitch 96 (Figs. 1 and 7) which is closed whenever a spring button 98 therein is released. Mounted adjacent to this button is a swinging lever 100 which turns on a screw 102 to a limited extent, there being a spring 104 to create friction between the lever and a base plate 106 on which it is mounted. This plate is carried by a bracket 108 on the frame 12 adjacent to another bracket 110 which supports the solenoid 90. Movement is imparted to the switch actuating lever 100 by stop screws 112 adjustably positioned upon a slide 114, the latter being guided upon the base plate 106 by a screw 116 passing through a slot in the slide. On this slide is a rod 118 having a head 120 for a purpose to be later explained.

When the extruding device is to be used for filling a portable dispensing gun 130, the passage 16 is provided with a lining sleeve 122 shown as integral with an end plate 124 which is held on the block 10 by means of screws 126 (Fig. 6). At the inner end of the lining sleeve 122 there is threaded the screw fitting 22 which is provided with a conical recess coacting with the sleeve 122 to form a socket for the reception of the barrel 128 of the dispensing gun 130. The outer end of the barrel has an enlarged head 129. Within the barrel of the gun is a plunger 132 having a stem 134 which slides in a bushing 136 (Fig. 8) threaded in the head 129. Mounted on the outer end of the stem is a knob 138 having a lug 140 for a purpose which will later appear.

It will be seen from Fig. 8 that the dispensing opening at the end of the tapered portion of the barrel 128 of the gun is alined with and close to the outlet opening 20 in the fitting 22. Since the plastic material is forced into the gun with considerable pressure, it is necessary to hold the latter in its socket and to this end the outer end of the barrel of the gun has a partial circumferentially extending flange 142 projecting from the head 129. Mounted on the end plate 124 is an outwardly extending canopy 144 having an upturned end flange 146 which is slidable upon the stems of screw studs 148 and which is forcibly held against the end plate by springs 150 surounding those stems. This canopy has a slot 152 (Fig. 9) adapted to coact with the flange 142 on the gun to lock the latter in place when the gun is pushed into its socket as far as it will go and then given a partial rotation from the position of Fig. 5 to the position of Fig. 6. Handling of the gun is made easier by providing the head 129 with an integral laterally extending prong 154 on which there is mounted a handle 156. This handle is provided with an abutment 158 which cooperates with the right edge of the canopy 144 to guide the gun barrel into its socket into the position of Fig. 5. At that time the edge of the locking flange 142 slides along the left edge of the canopy. It should be noted that rotation of the knob 138 with respect to the barrel of the gun 130 is prevented by a tongue 160 (Fig. 2) which is integral with the gun and which slides in a groove 162 in the periphery of the knob.

It being desired to stop the drive for the extrusion device when the barrel of the gun is filled with plastic material, provision has been made for connecting the knob 138, which is attached to the plunger 132, to the head 120 of the switch operating mechanism. Consequently the head 120 is provided with a projection 164 which, when the gun handle has been turned to the position of Fig. 6 to lock the gun to the extruding apparatus, is in alinement with the lug 140 on the knob. The head is also provided with a latch 170 (Fig. 7) which normally projects from the face of the head in the manner shown in that figure. It is held in projecting position by a spring surrounding the stem of the latch and is limited as to inward movement by retaining nuts on the end of the latch. It will be noted that the inner end of the latch is notched to provide a flat surface for engagement by the inner face of the locking flange 142 when the gun is positioned as in Fig. 5 and is being pushed home and has an inner end surface which is inclined to the axis of the guns so that the latch may be pushed aside by the flange 142 on the filled gun which flange is, at that time, back of said latch.

It will be noted that the block 10 and the sleeve 122 are provided with registering overflow discharge openings 172, closed by the gun while it is being filled but opened when the gun is displaced axially, as later described.

In the operation of the device, the gun will be inserted in its socket under the guidance of the abutment 158 sliding along the side of the canopy until the gun can be turned clockwise to enter the flange 142 in the slot 152. During its inward movement, the flange 142 will engage the notch of the latch 170 thereby pushing in the slide 114 to operate the switch and start the drive of the extruding mechanism. The extruded plastic material issuing through the outlet 20 will enter the opening in the end of the gun barrel and as the barrel is filled will push back the plunger and its stem 134 thereby moving the knob 138 to the left in Fig. 7. As the gun becomes filled the lug 140 on the knob will engage the projection 164 from the switch operating head 120, moving the slide 114 to the left and swinging the lever 100 to allow the switch button 98 to protrude, thus shutting off the flow of current to the solenoid 90 and permitting the spring 88 to swing the clutch lever 82 and discontinue the drive. If there is any malfunction of the parts, there is no danger of breakage because the advancing plastic material will simply push the gun barrel back in its socket, compressing the springs 150 surrounding the studs which support the canopy 144. This will allow the excess extruded material to pass between the fitting 22 and the tapered end of the gun barrel and to drain off through the overflow discharge opening 172. After the drive has been disconnected the gun may be removed from its socket by turning the handle to the position shown in Fig. 5. This will carry the lug 140 out of alinement with the projection 164 on the switch operating member but it will bring the flange 142 behind the inner end of the latch 170. However, the inclination of this end of the latch will permit it to snap back out of the way as it is contacted by the flange 142.

Having thus described my invention, what I claim as new and desire to secure by Letters Patent of the United States is:

1. In an extruding machine for plastic materials, an elongated block having a feed passage extending lengthwise thereof and provided with a socket at its outlet end for receiving a container to be filled, said socket having an overflow discharge opening adjacent to and positioned to be closed by the inserted container, means for holding a container in said socket, means for heating said block, and a feed screw in the passage driven to carry granular material which is progressively melted as it proceeds along the passage and is extruded into the container, said container holding means being yieldable to allow displacement of the container under pressure of the extruded material thereby to open the overflow passage.

2. In combination, a plunger-operated dispensing gun, an extruding mechanism for filling said gun, said plunger having a knob outside the gun, said extruding mechanism having means to receive and support the gun while it is being filled, coacting members on the gun and the mechanism for holding the two in engagement during the filling and arranged to be brought into operative relation by partial rotation of the gun in its support, said extruding mechanism having a feed member adapted to be connected to electric drive, a switch for controlling said electric drive, a movable switch-operating member supported on the extruding mechanism adjacent to the gun-receiving portion thereof, cooperating guide members on the gun and the extruding mechanism to lead the gun into operative relation to the extruding mechanism, coacting lugs on the switch-operating member and on the knob adapted to pass one another as the gun is moved into position under the guidance of said coacting members, and means for use in imparting a partial rotation to the supported gun to bring said lugs into alinement so that the outward movement of the plunger knob during filling of the gun will cause movement of the switch-operating member.

3. In combination, a plunger-operated dispensing gun, an extruding mechanism for filling said gun with plastic material, said mechanism having a feeding member arranged for operation by an electrical drive, a switch adapted to be connected to said electrical drive to control the latter, a switch-operating member movably supported on said extruding mechanism, said extruding mechanism having means for supporting a gun in plastic-receiving position, said gun-plunger having an externally positioned knob, a latch on said switch-operating member, means on the gun for pushing the latch to carry the switch-operating member to drive position as the gun is inserted in its supporting means, and a lug on the knob for engagement with said switch-operating member to move it in the other direction as the plunger is pushed back by the plastic during the filling of the gun, to stop the drive.

4. In an extruding machine for plastic materials, an elongated heated block provided with a longitudinal passage, one end of the passage being recessed in a shape to receive a portion of a container to be filled, means to hold said container to the block, the other end of the passage forming an inlet hopper opening in the block above the passage to receive a supply of plastic material in granular form, a feed screw in the passage for carrying the material into the aforesaid container, that edge surface of the hopper-like inlet opening which is above the feed screw where it enters the main passage being sloped inwardly and thus undercut, a reversely threaded auxiliary feed screw in the hopper portion on the side toward which the top of the feed screw rotates, and means for driving said screws in opposite directions.

5. The combination of a portable, plunger-containing gun to be filled and an extruding machine for forcing plastic material into the gun, in which the extruding machine comprises a hollow casing containing a driven extruding member, the hollow casing being provided with an outlet against which the gun is seated with its dispensing opening in register with said outlet to receive extruded material, with a resultant movement of the plunger as the gun is filled, a switch-operating member movably mounted on said extruding machine, and coacting means upon the gun parts and the casing of the extruding machine for holding the gun seated against the outlet and for connecting the plunger of the gun to the switch-operating member to cause the extruding member to be stopped when the gun has been filled.

6. An arrangement, for filling a gun provided with a dispensing opening and containing a movable plunger, which consists of an extruding machine having a casing which is provided with an outlet opening, said machine also having a movable extruding member adapted to be electrically driven, a switch for connection in the circuit of said electrical drive to control it, said switch being provided with an operating member movably mounted on the machine adjacent to the force-feed mechanism, means for preventing a rotation of the plunger with respect to the gun, and means brought into engagement by operator-controlled partial rotation of the gun with respect to the extruding machine for connecting the plunger temporarily to the switch-operating member and for connecting the gun to the extruding machine to receive material extruded through said outlet opening.

HANS C. PAULSEN.

References Cited in the file of this patent

UNITED STATES PATENTS

| Number | Name | Date |
|---|---|---|
| 1,178,908 | Fisher | Apr. 11, 1916 |
| 1,399,240 | Bagley et al. | Dec. 6, 1921 |
| 2,229,476 | Reichle | Jan. 21, 1941 |
| 2,360,984 | Schmitz | Oct. 24, 1944 |
| 2,432,734 | Doesken | Dec. 16, 1947 |
| 2,441,222 | Fuller | May 11, 1948 |

FOREIGN PATENTS

| Number | Country | Date |
|---|---|---|
| 492,462 | Great Britain | Sept. 21, 1938 |